(12) United States Patent
Chien (10) Patent No.: US 8,544,139 B2
(45) Date of Patent: Oct. 1, 2013

(54) WINDSHIELD WIPER BLADE STRUCTURE

(75) Inventor: Ching Chuan Chien, Taipei (TW)

(73) Assignee: Unipoint Electric Mfg, Co., Ltd, Taipei (TW)

( * ) Notice: Subject to any disclaimer, the term of this patent is extended or adjusted under 35 U.S.C. 154(b) by 1073 days.

(21) Appl. No.: 12/410,257

(22) Filed: Mar. 24, 2009

(65) Prior Publication Data

US 2010/0242204 A1 Sep. 30, 2010

(51) Int. Cl.
*B60S 1/32* (2006.01)
*B60S 1/38* (2006.01)

(52) U.S. Cl.
USPC .............. 15/250.44; 15/250.451; 15/250.454; 15/250.453

(58) Field of Classification Search
USPC ............ 15/250.201, 250.31, 250.48, 250.32, 15/250.361, 250.43, 250.452, 250.454, 250.44, 15/250.451, 250.453
See application file for complete search history.

(56) References Cited

U.S. PATENT DOCUMENTS

| | | | | |
|---|---|---|---|---|
| 4,442,566 A * | 4/1984 | Sharp | | 15/250.454 |
| 4,583,259 A * | 4/1986 | Will | | 15/250.452 |
| 7,461,429 B2 * | 12/2008 | Huang | | 15/250.43 |
| 7,827,652 B2 * | 11/2010 | Yang et al. | | 15/250.32 |
| 2004/0181894 A1* | 9/2004 | Lee et al. | | 15/250.201 |
| 2006/0107485 A1* | 5/2006 | Kim | | 15/250.201 |
| 2008/0222833 A1* | 9/2008 | Henin et al. | | 15/250.201 |
| 2008/0289133 A1* | 11/2008 | Kim | | 15/250.32 |

* cited by examiner

*Primary Examiner* — Joseph J Hail
*Assistant Examiner* — Henry Hong
(74) *Attorney, Agent, or Firm* — WPAT P.C.; Anthony King (57) ABSTRACT

A windshield wiper blade structure includes a support strip, a wiper strip disposed below the support strip, two flexible strips set on two sides of the wiper strip, a set of clamping elements downward extended through holes formed on the support strip to clamp the support strip, the flexible strips and the wiper strip together, two wind deflector strips disposed on a top of the support strip, two elastic locking elements each including two elastic arms separately fitted near two opposite ends of the support strip, and two end caps detachably connected to the two ends of the support strip and each internally provided with two notches engaged with the elastic arms. By compressing the elastic arms toward each other to disengage them from the notches, the end caps can be removed from the support strip to allow replacement of the wiper strip with a new one.

10 Claims, 13 Drawing Sheets

WINDSHIELD WIPER BLADE STRUCTURE

FIELD OF THE INVENTION

The present invention relates to a windshield wiper blade structure, and more particularly to a windshield wiper blade structure that allows a user to easily replace a wiper strip thereof with a new one.

BACKGROUND OF THE INVENTION

A windshield wiper structure is usually installed close to a windshield of a motor vehicle, and a wiper blade thereof is driven to swing back and forth within a generally sector-shaped wiping area. The wiper blade has a wiper strip made of a rubber material for wiping off deposited dust or water, such as wiping accumulated rainwater or snow from the windshield.

Figure 1:
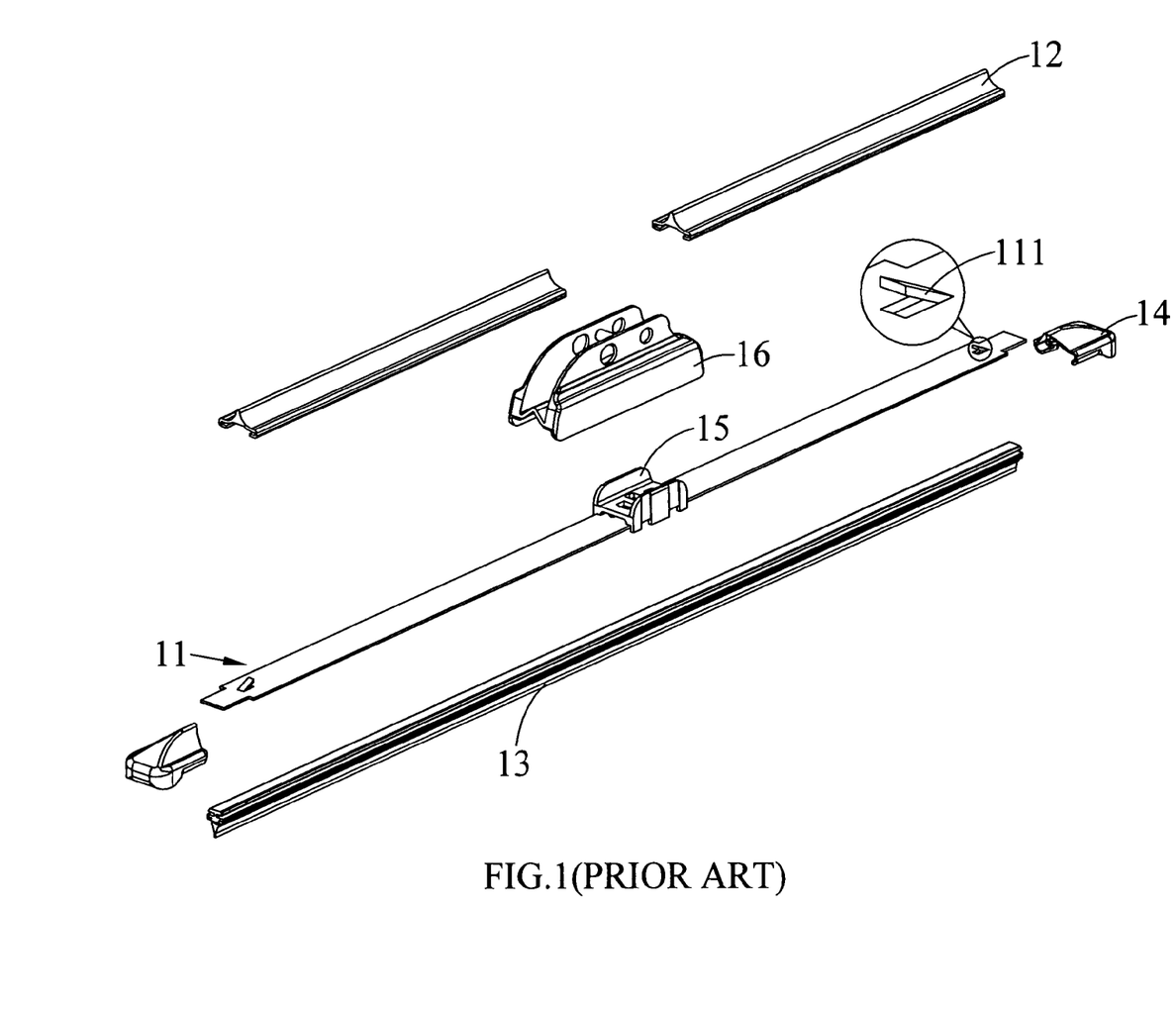
FIG. 1 is an exploded perspective view of a conventional windshield wiper blade structure.
Figure 2:
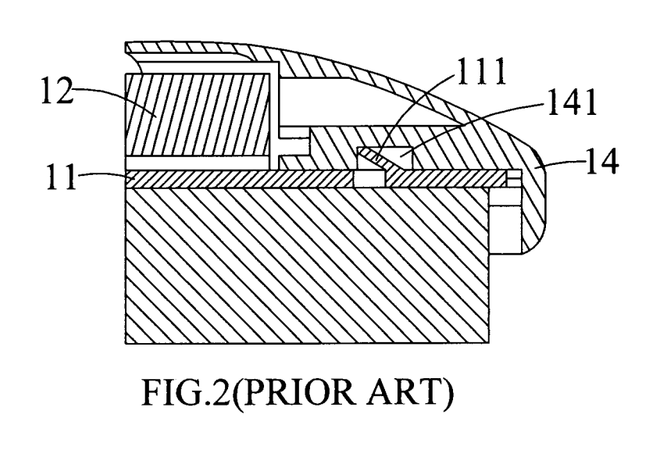
FIG. 2 is a fragmentary, enlarged and assembled sectional view of the conventional windshield wiper blade structure of FIG. 1.

FIG. 1 is an exploded perspective view of a conventional windshield wiper blade structure; and FIG. 2 is a fragmentary, enlarged and assembled sectional view of the conventional windshield wiper blade structure of FIG. 1. As shown, the conventional windshield wiper blade structure includes a support strip 11, two wind deflector strips 12 disposed on a top of the support strip 11, a wiper strip 13 disposed on a bottom of the support strip 11, two end caps 14 fitted to two longitudinally opposite ends of the associated support strip 11 and wiper strip 13, a bracket 15, and a protective cover 16 covering the bracket 15. The support strip 11 is provided near each of the two opposite ends thereof with an elastic hooking portion 111, which is formed by punching with a free end upward projecting from the top of the support strip 11 at an inclination to provide a degree of elasticity. Each of the end cap 14 is internally provided at a predetermined position with a notch 141 corresponding to the elastic hooking portion 111, such that when the end cap 14 is fitted onto one end of the support strip 11, the notch 141 is engaged with the elastic hooking portion 111 to thereby hold the end cap 14 to the end of support strip 11 and the wiper strip 13 to the bottom of the support strip 11. With these arrangements, the wiper strip 13 is prevented from sliding off the support strip 11. The windshield wiper blade structure can be detachably connected to a wiper bracket provided on the motor vehicle, and driven to swing back and forth on the windshield to wipe off rainwater. After having been swung back and forth on the windshield to wipe off rainwater or snow over a long period of time, the wiper strip 13 tends to become deformed or damaged due to elastic fatigue and must be replaced with a new one. In the above described conventional windshield wiper blade structure, the end caps 14 are not detachable from the support strip 11 once they are engaged with the elastic hooking portions 111. The wiper strip 13 can be removed from the support strip 11 only when the end caps 14 and the elastic hooking portions 111 are destroyed to separate the end caps 14 from the ends of the support strip 11. That is, when the wiper strip 13 is aged or damaged, the whole set of the conventional windshield wiper blade structure must be replaced. This is of course not economical to do so.

In addition, since the support strip 11 is made of a relatively tough material and has a relatively large thickness, it is uneasy to punch the support strip 11 at two ends thereof to form the two elastic hooking portions 111. Thus, the conventional windshield wiper blade structure is manufactured at increased cost.

SUMMARY OF THE INVENTION

It is therefore a primary object of the present invention to provide a windshield wiper blade structure that allows a user to easily replace a wiper strip thereof with a new one, so as to overcome the problem of requiring high cost to replace a whole set of windshield wiper blade when a wiper strip thereof is aged or damaged, as found in the prior art.

To achieve the above and other objects, the windshield wiper blade structure according to an embodiment of the present invention includes a support strip; a wiper strip being disposed on a first face of the support strip; a set of wind deflector strips being disposed on a second face of the support strip opposite to the wiper strip; and a binding component.

The binding component can be compressed to deform, so as to be fitted to two longitudinally opposite ends of the support strip, and the binding component can be then released to restore to its original state and become locked to the two longitudinally opposite ends of the support strip.

The windshield wiper blade structure according to another embodiment of the present invention includes a support strip being formed with a plurality of holes; a wiper strip being disposed on a first face of the support strip; a set of flexible strips being set on two opposite lateral sides of the wiper strip; a set of clamping elements being extended through the plurality of holes on the support strip to thereby clamp the support strip, the flexible strips and the wiper strip together to form an integral body; a set of wind deflector strips being disposed on a second face of the support strip opposite to the wiper strip; and a binding component. The binding component can be compressed to deform, so as to be fitted to two longitudinally opposite ends of the support strip, and the binding component can be then released to restore to its original state and become locked to the two longitudinally opposite ends of the support strip.

The binding component includes a pair of elastic locking elements and a pair of end caps. Each of the elastic locking elements includes a pair of elastic arms being fixed to two opposite lateral sides of the support strip near one of the two longitudinally opposite ends of the support strip, and each of the end caps is configured for detachably connecting to one of the two longitudinally opposite ends of the support strip. By compressing the two elastic arms toward each other to thereby move the elastic arms into the corresponding end cap and then releasing the elastic arms to allow them to expand outward, the elastic arms can engage with the end cap to lock the same in place.

The windshield wiper blade structure according to a further embodiment of the present invention includes a set of support strips, a wiper strip, a set of wind deflector strips, a set of elastic locking elements, and a set of end caps. The wiper strip is provided at two opposite lateral sides with a plurality of grooves each, and the set of support strips is set in two oppositely corresponding grooves. The set of wind deflector strips is disposed on one face of the support strips. Each of the elastic locking elements includes two elastic arms, and is fixed to one of two longitudinally opposite ends of the set of support strips. Each of the end caps is internally provided with two notches corresponding to the two elastic arms of the elastic locking element, and is detachably fitted to one of the two longitudinally opposite ends of the set of support strips. By compressing the two elastic arms toward each other to allow fitting of the end cap on one end of the set of support strips and then releasing the elastic arms to allow them to expand outward, the elastic arms can be engaged with the notches on the end cap.

The windshield wiper blade structure according to a still further embodiment of the present invention includes a support strip, a wiper strip, a set of wind deflector strips, a set of elastic locking elements, and a set of end caps. The wiper strip is disposed on one face of the support strip, and the set of wind deflector strips is disposed on another face of the support strip opposite to the wiper strip. Each of the elastic locking elements includes two elastic arms, and is fixed to one of two longitudinally opposite ends of the support strip. Each of the end caps is internally provided with two notches corresponding to the two elastic arms of one elastic locking element. By compressing the two elastic arms toward each other to allow fitting of the end cap on one end of the support strip and then releasing the elastic arms to allow them to expand outward, the elastic arms can be engaged with the notches on the end cap. The support strip is provided with a long slit, an end of which extends through one end of the support strip to form an open end, and the other end of the long slit extends toward the other end of the support strip without extending therethrough, so that a stopper portion is formed at the other end of the support strip.

With the above arrangements, the end caps can be connected to or removed from two longitudinally opposite ends of the support strip simply by compressing the two elastic arms on each of the elastic locking elements toward each other and then releasing the two elastic arms, enabling a user to easily remove the damaged or aged wiper strip from the support strip for replacement without the need of discarding a whole set of the windshield wiper blade structure. Therefore, the maintenance and repair cost can be reduced.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

The present invention will now be described with some preferred embodiments thereof with reference to the accompanying drawings.

Figure 3:
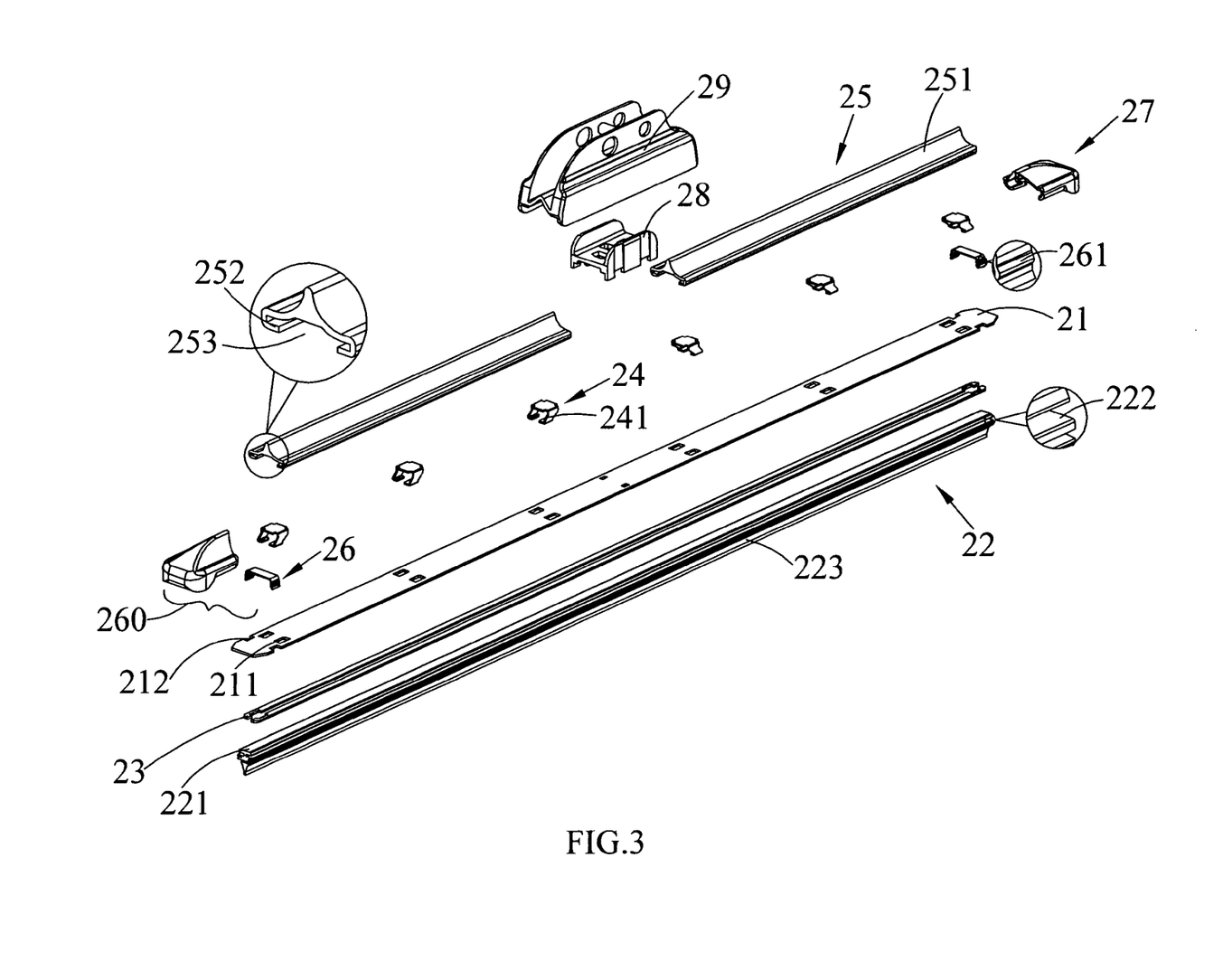
FIG. 3 is an exploded perspective view of a windshield wiper blade structure according to a first embodiment of the present invention.
Figure 4:
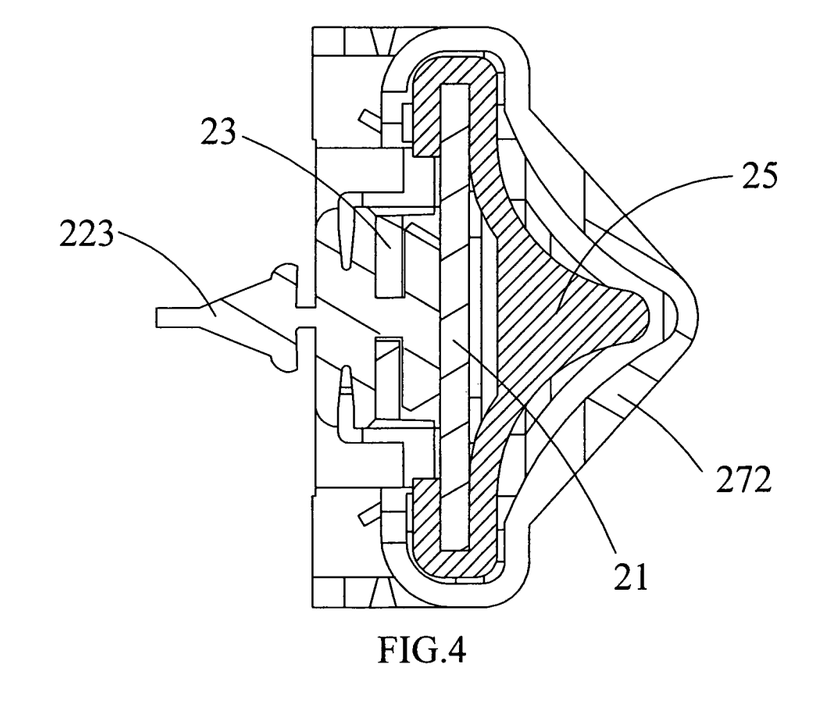
FIG. 4 is an assembled cross-sectional view of the windshield wiper blade structure of FIG. 3.

Please refer to FIG. 3 that is an exploded perspective view of a windshield wiper blade structure according to a first embodiment of the present invention, and to FIG. 4 that is an enlarged assembled cross-sectional view of the windshield wiper blade structure of FIG. 3. As shown, the windshield wiper blade structure in the first embodiment includes a support strip 21, a wiper strip 22, two flexible strips 23, a plurality of clamping elements 24, two wind deflector strips 25, a binding component 260, a bracket 28, and a protective cover 29. The binding component 260 includes two elastic locking elements 26 and two end caps 27.

The support strip 21 is formed with a plurality of pairs of holes 211 and two notched sections 212. The pairs of holes 211 are axially equally spaced along the support strip 21 and the holes in each of the pairs are arranged side by side on the support strip 21. The wiper strip 22 is located below the support strip 21, and includes an elongate top plate 221 for bearing against the support strip 21, a plurality of longitudinally extended grooves 222 correspondingly formed on each of two opposite lateral sides thereof, and a wiping lip 223 located opposite to the top plate 221. The two flexible strips 23 are separately set in two oppositely corresponding grooves 222 on the wiper strip 22. Each of the clamping elements 24 has two downward extended lateral sides to provide two L-shaped clamping arms 241. By extending the L-shaped clamping arms 241 of each of the clamping elements 24 through one of the pairs of holes 211 on the support strip 21 to engage free edges of the L-shaped clamping arms 241 with another two oppositely corresponding grooves 222 on the wiper strip 22 below the two flexible strips 23, the support strip 21, the flexible strips 23, and the wiper strip 22 can be clamped together to form an integral body.

The two wind deflector strips 25 each have a wind deflecting section 251. Two opposite parallel edges of the wind deflecting section 251 are downward and then inward bent toward each other to form two guide rails 252, such that a slide way 253 is defined between the wind deflecting section 251 and the two guide rails 252. The support strip 21 can be slid along the guide rails 252 into the slide way 253, so that the wind deflector strip 25 is held to a top of the support strip 21.

The elastic locking elements 26 each have two downward extended elastic arms 261 separately formed at two opposite lateral sides thereof, and are separately fitted in the two notched sections 212 on the support strip 21.

Figure 5:
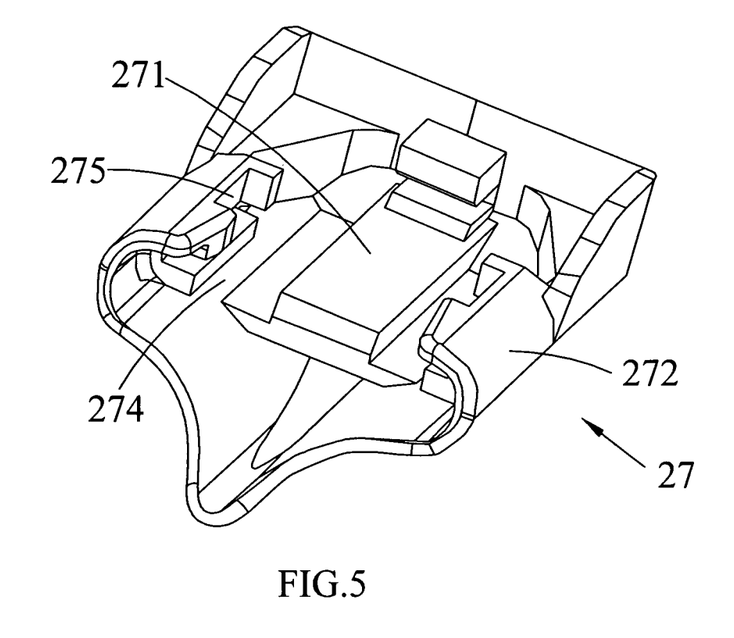
FIG. 5 is a perspective view showing an inner structure of a first embodiment of an end cap for the windshield wiper blade structure of FIG. 3.

The two end caps 27 are separately connected to two longitudinally opposite ends of the support strip 21. FIG. 5 is a perspective view showing an inner structure of a first embodiment of the end caps 27. As shown, each of the end caps 27 has a main body 271 and a shell 272 covering the main body 271. Two opposite lateral sides of the shell 272 are downward and inward bent toward each other, and two notches 275 are separately formed at free edges of the inward bent lateral sides of the shell 272 corresponding to the elastic arms 261 of the elastic locking element 26. A space 274 is formed between each of two lateral sides of the main body 271 and the shell 272. Each of the two spaces 274 is slightly larger than a thickness of the elastic arm 261, so that the elastic arms 261 of the elastic locking element 26 can pass through the spaces 274. The two elastic arms 261 on the elastic locking element 26 can be compressed toward each other or be released to elastically expand outward.

The bracket 28 is disposed on the top of the support strip 21 to locate between the two wind deflector strips 25 for a wiper arm (not shown) to pivotally connect thereto, so that the wiper arm can drive the bracket 28 to move reciprocatingly. The protective cover 29 is fitted on the bracket 28 to protect the bracket 28 against rust due to invasion of and corrosion by water.

Figure 6:
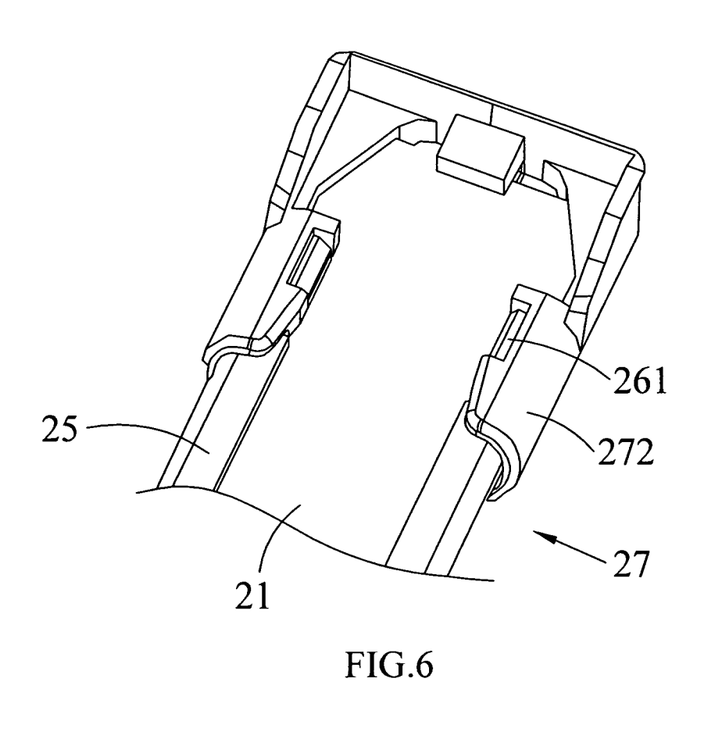
FIG. 6 shows a first manner of connecting the end cap to an end of a support strip for the windshield wiper blade structure of FIG. 3.

FIG. 6 shows a first manner of connecting the end cap 27 to one end of the support strip 21 according to the present invention. Please refer to FIGS. 5 and 6 at the same time. To connect the end cap 27 to one end of the support strip 21, first compress the two elastic arms 261 of the locking element 26 at that end for them to move toward each other and become aligned with the two spaces 274. Thereafter, fit the end cap 27 on the two guide rails 252 at an outer end of the corresponding wind deflector strip 25 and then guide the two elastic arms 261 through the two spaces 274 to the two notches 275, allowing the two lateral sides of the support strip 21 to locate in the end cap 27. At this point, one end of the already assembled support strip 21 and wind deflector strip 25 can be smoothly set in the shell 272 of the end cap 27. Then, the compressed elastic arms 261 are released, allowing the elastic arms 261 to elastically spring outward to thereby move into and firmly press against the two notches 275. With the two elastic arms 261 being separately engaged with the two notches 275, the end cap 27 is fixedly held to the support strip 21, as shown in FIG. 8.

When it is desired to replace the wiper strip 22, simply compress the two elastic arms 261 of the elastic locking element 26 at each of two ends of the support strip 21, so that the two elastic arms 261 are moved toward each other to align with the two spaces 274. At this point, the end cap 27 is no longer held to the support strip 21 by the elastic arms 261, and the elastic arms 261 can be slid along the two spaces 274 to move the support strip 21 out of the end cap 27. With the support strip 21 disengaged from the end caps 27, the wiper strip 22 can be removed from the support strip 21 and replaced with a new one.

Figure 7:
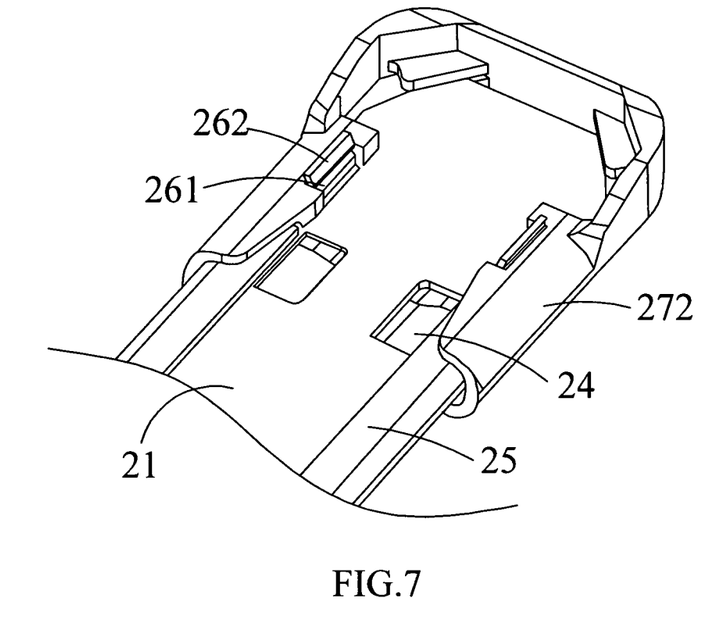
FIG. 7 shows a second manner of connecting the end cap to an end of the support strip for the windshield wiper blade structure of FIG. 3.

FIG. 7 shows a second manner of connecting the end cap 27 to one end of the support strip 21 according to the present invention. Please refer to FIGS. 5 and 7 at the same time. To enable easy connection of the end cap 27 to one end of the support strip 21, free edges of the elastic arms 261 can be further outward extended to form a push portion 262 each, so that the push portions 262 are projected from the notches 275 when the elastic arms 261 are engaged with the notches 275. With the push portions 262, a user can connect or disconnect the end cap 27 to or from the support strip 21 using two hands without the need of any tool.

Figure 8:
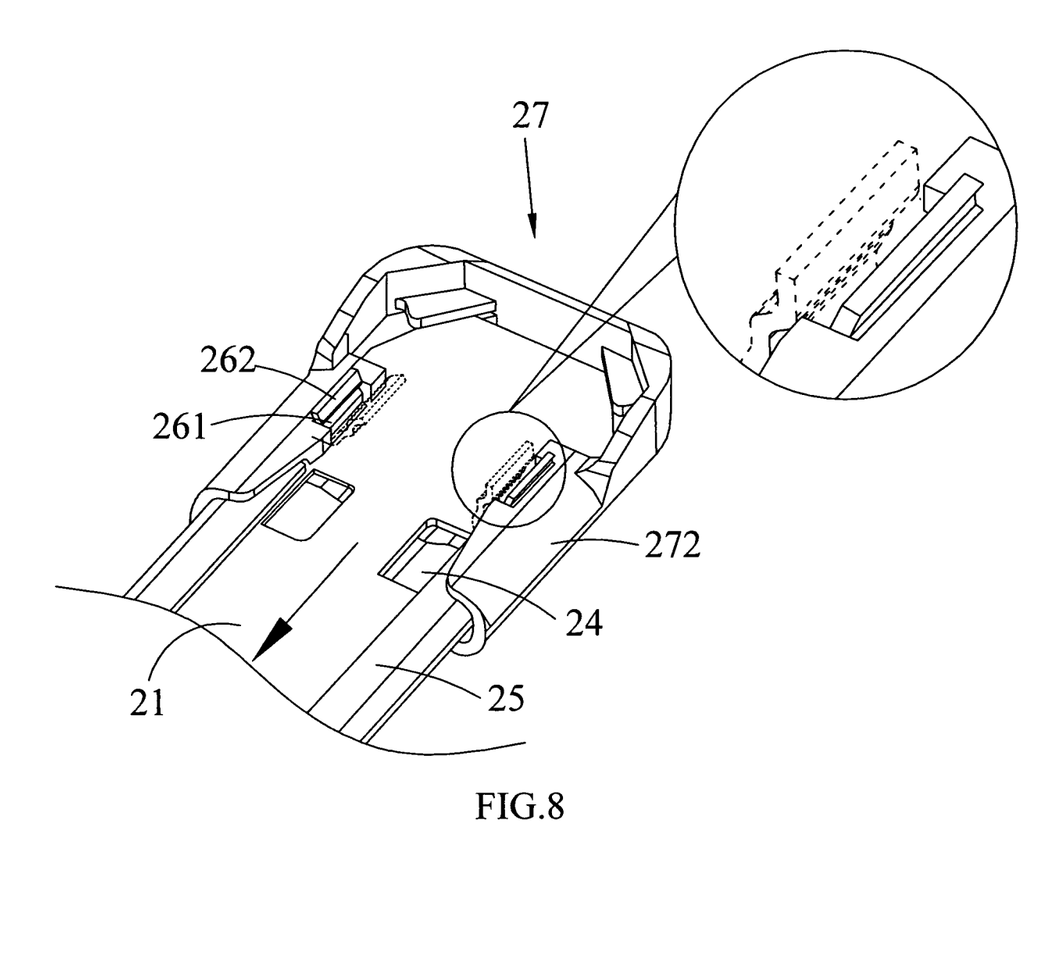
FIG. 8 shows how the end cap is locked to the support strip via an elastic locking element.
Figure 9:
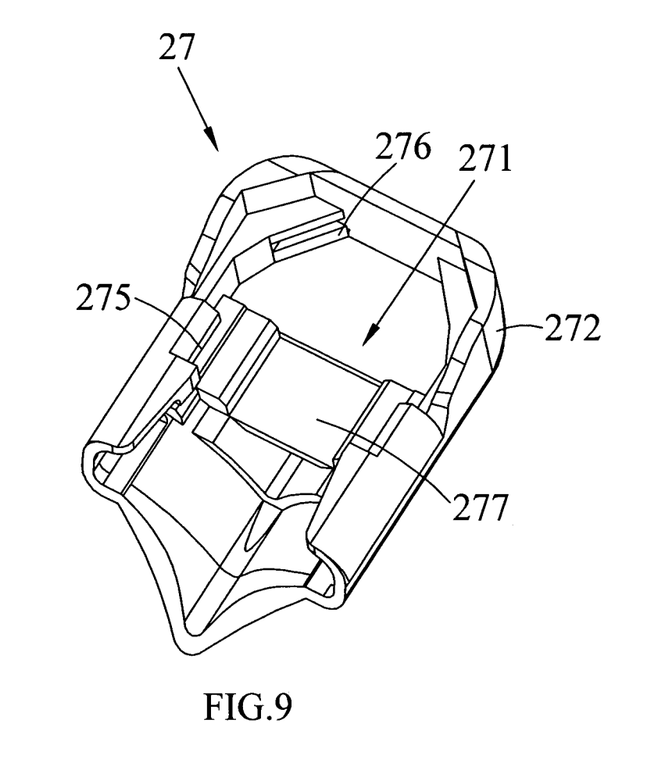
FIG. 9 is a perspective view showing an inner structure of a second embodiment of the end cap for the windshield wiper blade structure of FIG. 3.

FIG. 8 is a perspective view showing an inner structure of a second embodiment of the end cap 27. As shown, in the second embodiment thereof, the end cap 27 includes a main body 271 and a shell 272 covering the main body 271. The shell 272 of the end cap 27 in the second embodiment thereof is provided at free edges of two inward bent opposite lateral sides with a notch 275 each, an axially rear end of which is an open end; and at two axially rear inner corners with a clamping portion 276 each for clamping the support strip 21 in place in the end cap 27, as shown in FIG. 9. The main body 271 of the end cap 27 in the second embodiment thereof is formed near one end with a recess 277. With these arrangements, the end cap 27 can be more easily connected to or removed from the support strip 21.

Figure 10:
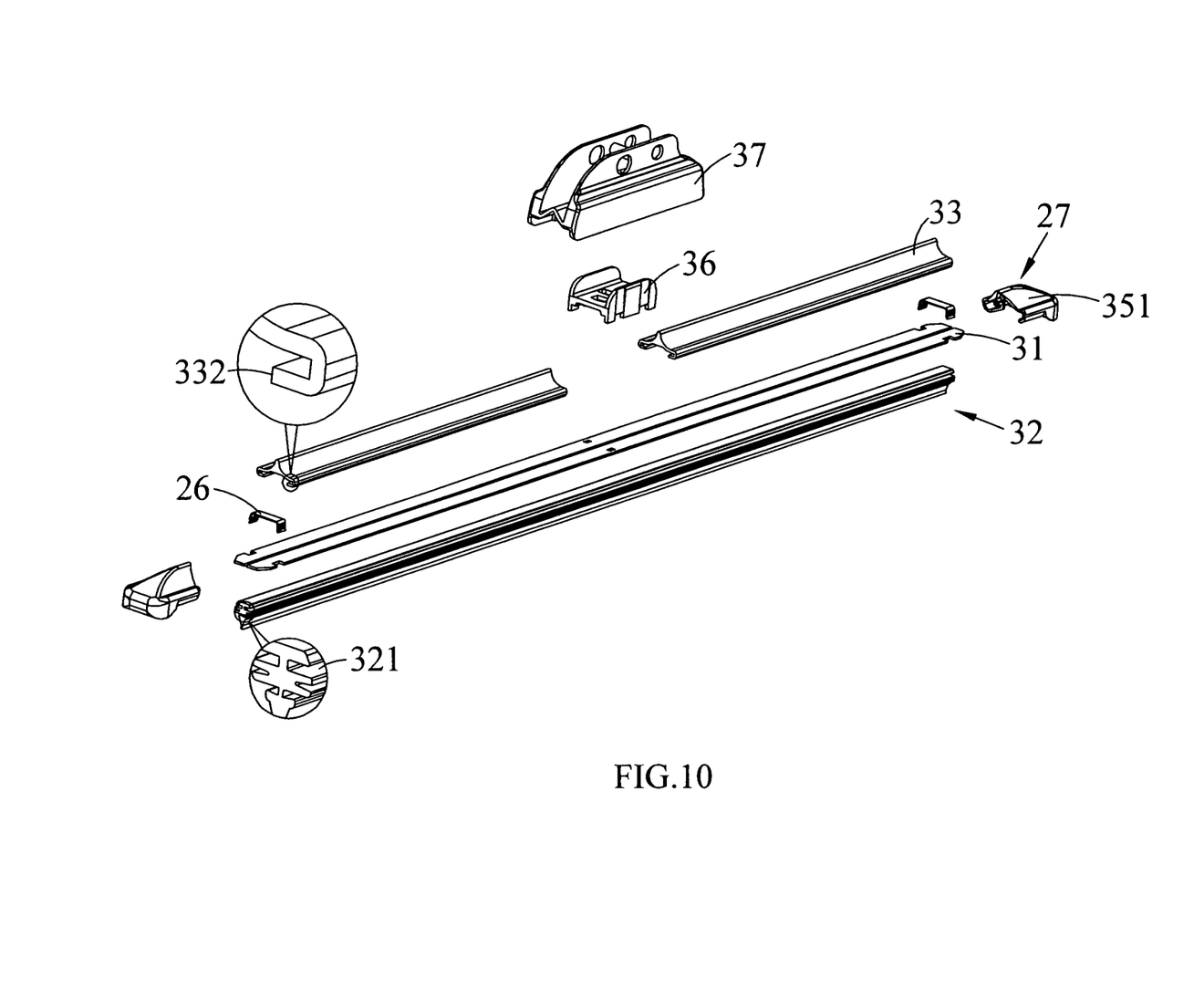
FIG. 10 is an exploded perspective view of a windshield wiper blade structure according to a second embodiment of the present invention.

Please refer to FIG. 10 that is an exploded perspective view of a windshield wiper blade structure according to a second embodiment of the present invention. In the second embodiment, the windshield wiper blade structure includes a plurality of support strips 31, a wiper strip 32, two wind deflector strips 33, two elastic locking elements 26 and two end caps 27, a bracket 36, and a protective cover 37. The wiper strip 32 is correspondingly formed at two opposite lateral sides with a plurality of longitudinally extended grooves 321 corresponding to the support strips 31. The support strips 31 are used to hold the wiper strip 32 and the wind deflector strips 33 thereto. The wiper strip 32 is used to wipe rainwater or snow off a windshield. The wind deflector strips 33 are used to guide rainwater to flow. The bracket 36 is used for a wiper arm (not shown) to pivotally connected thereto, so that the wiper arm can drive the support strip 31 to swing within a wiping area. The protective cover 37 protectively covers the bracket 36. Please refer to FIGS. 5 and 8 for the end caps 27 and to FIGS. 3 and 7 for the elastic locking elements 26 in the second embodiment of the present invention. Since the end caps 27 and the elastic locking elements 26 in the second embodiment of the present invention are structurally and functionally similar to those in the first embodiment, they are not discussed in details herein.

The second embodiment is different from the first embodiment in having two support strips 31. To assemble the supporting strips 31, the wind deflector strips 33 and the wiper strip 32 to one another, first correspondingly engage the two support strips 31 with two corresponding grooves 321 on the two opposite lateral sides of the wiper strip 32, and then slide the two support strips 31 into the wind deflector strips 33. Finally, connect the end caps 27 to two longitudinally opposite ends of the already assembled wind deflector strips 33 and wiper strip 32, so that the elastic locking elements 26 are engaged with and locked to the end caps 27 to thereby hold the end caps 27 to the support strips 31. The clamping elements 24 in the first embodiment for clamping the support strip 21 to the wiper strip 22 can therefore be omitted.

The connection of the end cap 27 to one end of the support strips 31 can also be understood by referring to FIGS. 5, 6 and 7. To connect the end cap 27 to the support strips 31, first compress the two elastic arms 261 of the locking element 26 for them to move toward each other and become aligned with the two spaces 274. Thereafter, fit the end cap 27 on an outer end of the corresponding guide rail 332 of the wind deflector strip 33 and then guide the two elastic arms 261 through the two spaces 274 to the two notches 275, allowing two lateral outer sides of the two support strips 31 to locate in the end cap 27. At this point, one end of the already assembled support strips 31 and wind deflector strip 33 can be smoothly set in the shell 272 of the end cap 27. Then, the compressed elastic arms 261 are released, allowing the elastic arms 261 to elastically spring outward to thereby move into and firmly press against the two notches 275. With the two elastic arms 261 being separately engaged with the two notches 275, the end cap 27 is fixedly held to the support strips 31, as shown in FIG. 8.

Figure 11:
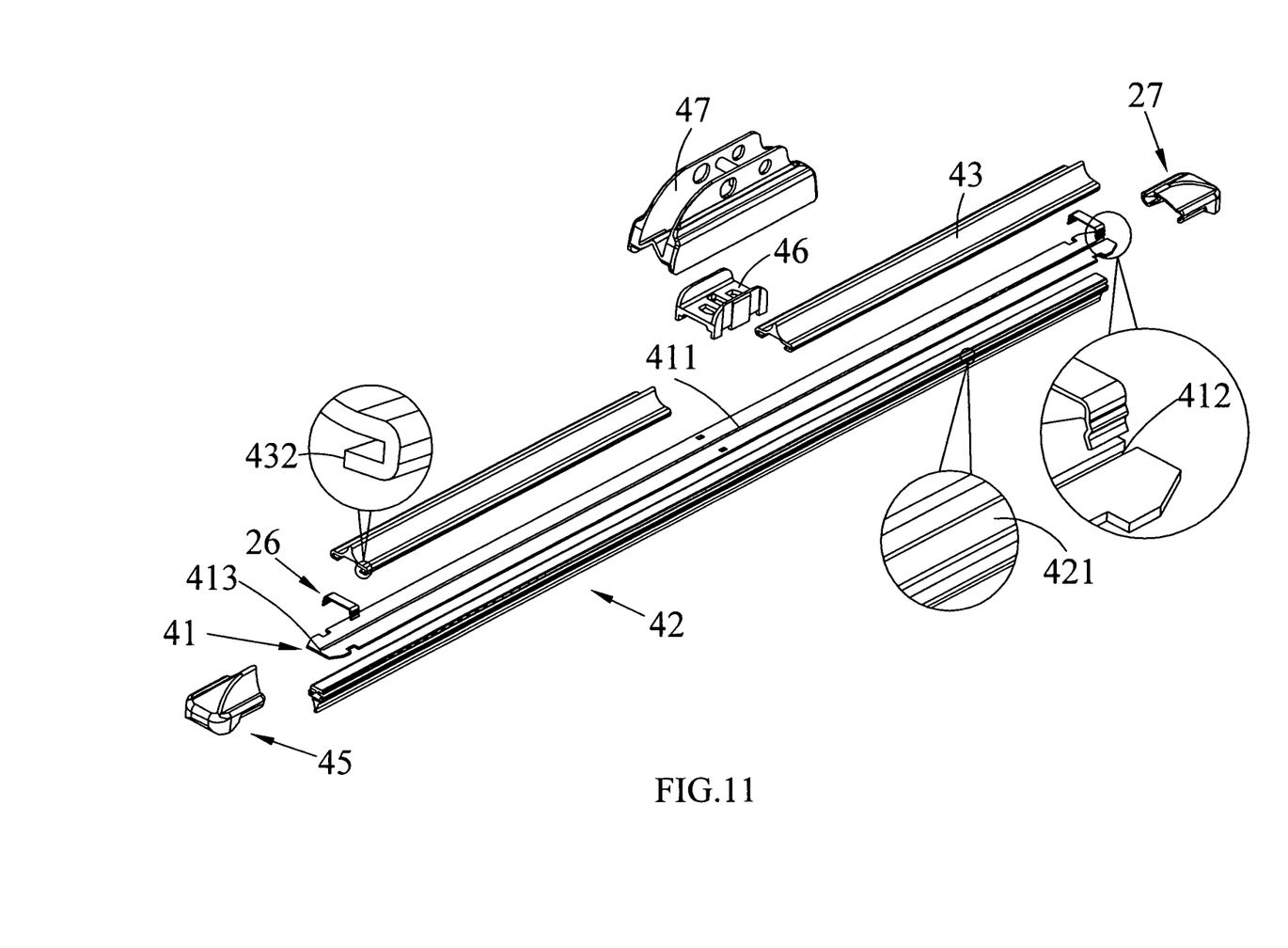
FIG. 11 is an exploded perspective view of a windshield wiper blade structure according to a third embodiment of the present invention.

Please refer to FIG. 11 that is an exploded perspective view of a windshield wiper blade structure according to a third embodiment of the present invention. In the third embodiment, the windshield wiper blade structure includes a support strip 41, a wiper strip 42, two wind deflector strips 43, two elastic locking elements 26 and two end caps 27, a bracket 46, and a protective cover 47. The wiper strip 42 is correspondingly formed at two opposite lateral sides with a pair of longitudinally extended grooves 421. Since the end caps 27 (referring to FIGS. 5 and 8), the elastic locking elements 26 (referring to FIGS. 3 and 7), the wiper strip 42, the wind deflector strips 43, the bracket 46, and the protective cover 47 in the third embodiment of the present invention are structurally and functionally similar to those in the first embodiment, they are not discussed in details herein.

The third embodiment is different from the first embodiment in the support strip 41 that includes a longitudinally extended long slit 411. The long slit 411 is aligned with a centerline of the support strip 41 to extend toward two longitudinally opposite ends of the support strip 41. One of two opposite ends of the long slit 411 extends through one of two ends of the support strip 41 to forms an open end 412. The other end of the long slit 411 ends near the other end of the support strip 41 without extending therethrough, so that a stopper portion 413 is formed at the other end of the support strip 41. With these arrangements, the support strip 41 forms two parallelly extended long strip parts, which are located at two opposite sides of the long slit 411 and connected to each other only at the stopper portion 413. To assemble the wiper strip 42 and the support strip 41 to each other, simply slide the wiper strip 42 into the long slit 411 via the open end 412 with the pair of grooves 421 separately engaging with the two long strip parts of the support strip 41, so that the wiper strip 42 and the support strip 41 are connected together.

The connection of the end cap 27 to one end of the support strip 41 can also be understood by referring to FIGS. 5, 6 and 7. To connect the end cap 27 to the support strip 41, first compress the two elastic arms 261 of the locking element 26 for them to move toward each other and become aligned with the two spaces 274. Thereafter, fit the end cap 27 on an outer end of the corresponding guide rail 432 of the wind deflector strip 43 and then guide the two elastic arms 261 through the two spaces 274 to the two notches 275, allowing two lateral outer sides of the support strip 41 to locate in the end cap 27. At this point, one end of the already assembled support strip 41 and wind deflector strip 43 can be smoothly set in the shell 272 of the end cap 27. Then, the compressed elastic arms 261 are released, allowing the elastic arms 261 to elastically spring outward to thereby move into and firmly press against the two notches 275. With the two elastic arms 261 being separately engaged with the two notches 275, the end cap 27 is fixedly held to the support strip 41, as shown in FIG. 8.

Figure 12:
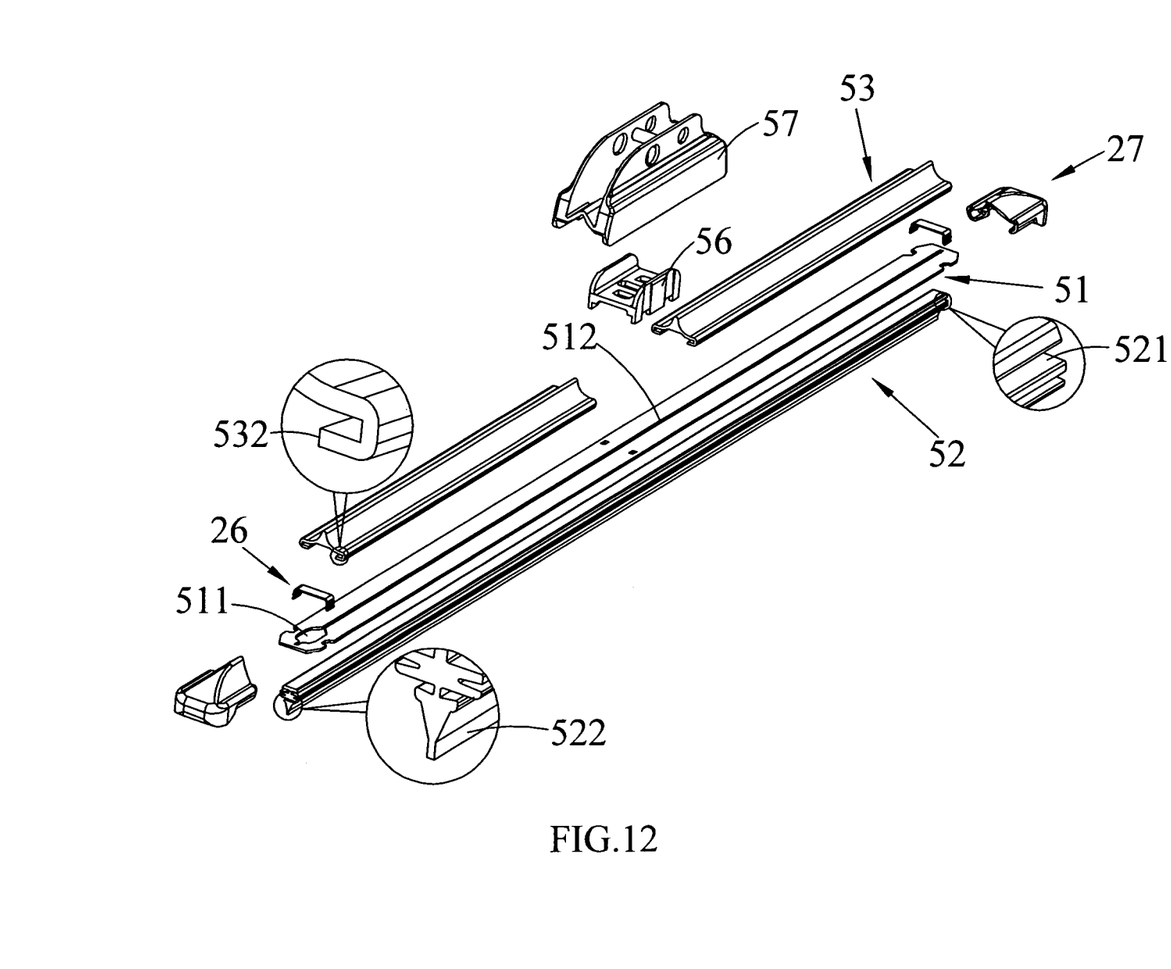
FIG. 12 is an exploded perspective view of a windshield wiper blade structure according to a fourth embodiment of the present invention.

Please refer to FIG. 12 that is an exploded perspective view of a windshield wiper blade structure according to a fourth embodiment of the present invention. In the fourth embodiment, the windshield wiper blade structure includes a support strip 51, a wiper strip 52, two wind deflector strips 53, two elastic locking elements 26 and two end caps 27, a bracket 56, and a protective cover 57. Since the end caps 27 (referring to FIGS. 5 and 8), the elastic locking elements 26 (referring to FIGS. 3 and 7), the wiper strip 52, the wind deflector strips 53, the bracket 56, and the protective cover 57 in the fourth embodiment of the present invention are structurally and functionally similar to those in the first embodiment, they are not discussed in details herein.

The fourth embodiment is different from the first embodiment in the support strip 51 that includes an expanded through hole 511 and a longitudinally extended long slit 512. The expanded through hole 511 is formed near one of two longitudinally opposite ends of the support strip 51. The long slit 512 extends at two ends toward the two longitudinally opposite ends of the support strip 51 without extending therethrough. However, one of the two ends of the long slit 512 communicates with the expanded through hole 511. The wiper strip 52 is correspondingly formed at two opposite lateral sides with a pair of longitudinally extended grooves 521 and has a wiping lip 522. The wiping lip 522 is made of a flexible material, such as a rubber material. With the expanded through hole 511 formed at one end of the support strip 51, an end of the wiper strip 52 can be pulled through the expanded through hole 511, so that the wiper strip 52 can be then downward pressed through the long slit 512 to engage the pair of grooves 521 with the portions of the support strip 51 at two opposite sides of the long slit 512, bringing the wiper strip 52 to be fixedly connected to the support strip 51.

The connection of the end cap 27 to one end of the support strip 51 can also be understood by referring to FIGS. 5, 6 and 7. To connect the end cap 27 to the support strip 51, first compress the two elastic arms 261 of the locking element 26 for them to move toward each other and become aligned with the two spaces 274. Thereafter, fit the end cap 27 on an outer end of the corresponding guide rail 532 of wind deflector strip 53 and then guide the two elastic arms 261 through the two spaces 274 to the two notches 275, allowing two lateral outer sides of the support strip 51 to locate in the end cap 27. At this point, one end of the already assembled support strip 51 and wind deflector strip 53 can be smoothly set in the shell 272 of the end cap 27. Then, the compressed elastic arms 261 are released, allowing the elastic arms 261 to elastically spring outward to thereby move into and firmly press against the two notches 275. With the two elastic arms 261 being separately engaged with the two notches 275, the end cap 27 is fixedly held to the support strip 51, as shown in FIG. 8.

Figure 13:
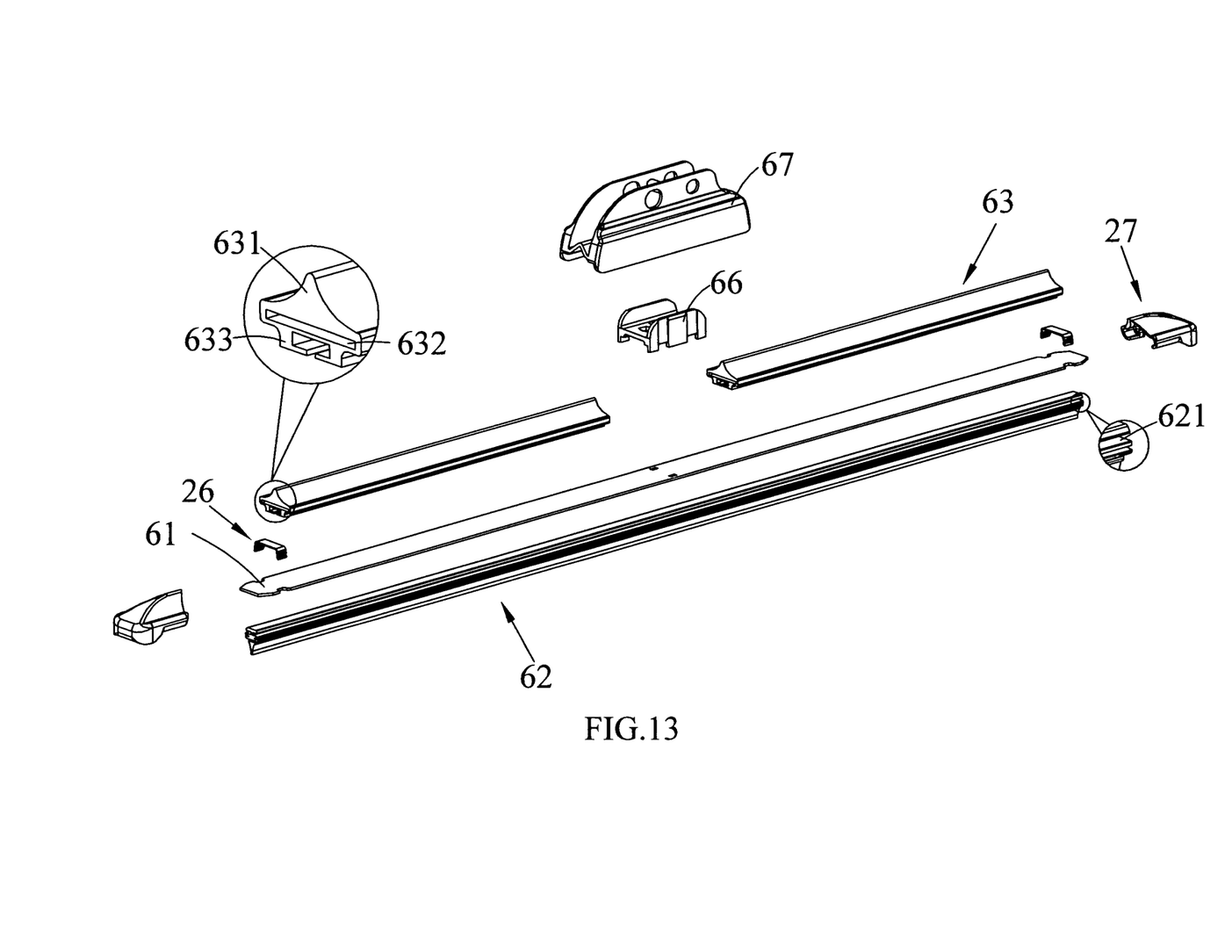
FIG. 13 is an exploded perspective view of a windshield wiper blade structure according to a fifth embodiment of the present invention.

Please refer to FIG. 13 that is an exploded perspective view of a windshield wiper blade structure according to a fifth embodiment of the present invention. In the fifth embodiment, the windshield wiper blade structure includes a support strip 61, a wiper strip 62, two wind deflector strips 63, two elastic locking elements 26 and two end caps 27, a bracket 66, and a protective cover 67. Since the end caps 27 (referring to FIGS. 5 and 8), the elastic locking elements 26 (referring to FIGS. 3 and 7), the support strip 61, the wiper strip 62, the bracket 66, and the protective cover 67 in the fifth embodiment of the present invention are structurally and functionally similar to those in the first embodiment, they are not discussed in details herein.

The fifth embodiment is different from the first embodiment in the wind deflector strips 63, each of which includes a wind deflecting section 631, an insertion channel 632, and two guide rails 633. The insertion channel 632 is located between the wind deflecting section 631 and the guide rails 633 for the support strip 61 to insert thereinto. The wiper strip 62 is correspondingly formed at two opposite lateral sides with a pair of longitudinally extended grooves 621. To assemble the support strip 61, the wind deflector strips 63 and the wiper strip 62 to one another, first insert the support strip 61 into the insertion channels 632 on the two wind deflector strips 63, so that the wind deflector strips 63 are fixedly connected to the support strip 61. Then, slide an end of the wiper strip 62 into between the two guide rails 633, so that the guide rails 633 are engaged with the pair of grooves 621, bringing the wiper strip 62 to connect to the wind deflector strips 63 and locate below the support strip 61. In this manner, the support strip 61, the wind deflector strips 63 and the wiper strip 62 are assembled together and held in place relative one another.

The connection of the end cap 27 to one end of the support strip 61 can also be understood by referring to FIGS. 5, 6 and 7. To connect the end cap 27 to the support strip 61, first compress the two elastic arms 261 of the locking element 26 for them to move toward each other and become aligned with the two spaces 274. Thereafter, fit the end cap 27 on an outer end of the corresponding guide rail 633 of wind deflector strip 63 and then guide the two elastic arms 261 through the two spaces 274 to the two notches 275, allowing two lateral outer sides of the support strip 61 to locate in the end cap 27. At this point, one end of the already assembled support strip 61 and wind deflector strip 63 can be smoothly set in the shell 272 of the end cap 27. Then, the compressed elastic arms 261 are released, allowing the elastic arms 261 to elastically spring outward to thereby move into and firmly press against the two notches 275. With the two elastic arms 261 being separately engaged with the two notches 275, the end cap 27 is fixedly held to the support strip 61, as shown in FIG. 8.

When the wiper strip is subjected to elastic fatigue and becomes aged, the windshield wiper blade structure of the present invention advantageously allows a user to remove the aged wiper strip from the support strip(s) simply by compressing the elastic arms of each of the elastic locking elements toward each other to release the elastic locking elements from the two end caps. That is, in the windshield wiper blade structure of the present invention, the end caps can be easily removed from two ends of the support strip(s) and the wiper strip can be conveniently replaced to reduce the user's maintenance and repair costs.

Another advantage provided by the present invention is the end caps and the elastic locking elements can be used with differently designed support strip(s) and wind deflector strips, allowing the present invention to be applied to different types of windshield wiper blade products.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A windshield wiper blade structure, comprising:
a support strip;
a wiper strip being disposed on a first face of the support strip;
a set of wind deflector strips being disposed on a second face of the support strip opposite to the wiper strip; and
a binding component;
wherein two elastic arms separately arranged at two opposite lateral sides of each of a pair of elastic locking elements of the binding component are fitted in and in contact with two notched sections on the two opposite lateral sides of the support strip; and each of a pair of end caps of the binding component is configured for detachably connecting to one of the two longitudinally opposite ends of the support strip; such that by compressing the two elastic arms toward each other, the elastic arms are moved into the corresponding end cap and then releasing the elastic arms to allow them to expand outward, the elastic arms are then engaged with the end cap and the support strip so as to lock the binding component into the two longitudinally opposite ends of the support strip;
wherein the pair of elastic locking elements is independent of each one of the pair of end caps, and the pair of end caps is independent of each one of the pair of elastic locking elements.

2. The windshield wiper blade structure as claimed in claim 1, wherein each of the end caps is provided at predetermined positions with two notches, and the released elastic arms of each of the elastic locking elements are extending into the notches to engage therewith.

3. The windshield wiper blade structure as claimed in claim 2, wherein each of the end caps includes a main body and a shell covering the main body; and the notches are formed on an inner side of the shell.

4. The windshield wiper blade structure as claimed in claim 3, wherein a space is formed between each of two opposite lateral sides of the main body and the inner side of the shell, and the space is larger than a thickness of each of the elastic arms.

5. A windshield wiper blade structure, comprising:
a support strip;
a wiper strip being disposed on a first face of the support strip;
a set of wind deflector strips being disposed on a second face of the support strip opposite to the wiper strip; and
a binding component, which includes:
a pair of elastic locking elements being fixed to and in contact with two notched sections on two opposite lateral sides of the support strip near two longitudinally opposite ends thereof; and
a pair of end caps being detachably connected to the two longitudinally opposite ends of the support strip;
whereby, by compressing the two elastic locking elements to deform them and then releasing them, the elastic locking elements can restore to an original state thereof and become engaged with the end caps to lock the end caps thereto;
wherein the pair of elastic locking elements is independent of each one of the pair of end caps, and the pair of end caps is independent of each one of the pair of elastic locking elements.

6. The windshield wiper blade structure as claimed in claim 5, wherein each of the elastic locking elements has two downward extended lateral sides to form two elastic arms, and each of the two end caps is provided on an inner side with two notches corresponding to the two elastic arms; whereby by compressing the two elastic arms toward each other to thereby move the elastic arms into the corresponding end cap and then releasing the elastic arms to allow them to expand outward, the elastic arms can be engaged with the notches on the end cap.

7. The windshield wiper blade structure as claimed in claim 5, wherein the support strip has an expanded through hole and a longitudinally extended long slit provided thereon; the long slit having two ends extending toward the two longitudinally opposite ends of the support strip without extending therethrough, while one of the two ends of the long slit being communicating with the expanded through hole; and wherein an upper part of the wiper strip is longitudinally set in the long slit.

8. The windshield wiper blade structure as claimed in claim 5, wherein the set of wind deflector strips includes two wind deflector strips, and each of the two wind deflector strips has a plurality of guide rails being separately formed at two lower lateral edges thereof, so that the wiper strip is connected to the wind deflector strips by inserting an upper part of the wiper strip into and between the two guide rails.

9. The windshield wiper blade structure as claimed in claim 6, wherein each of the end caps includes a main body and a shell covering the main body therein, and the notches are formed on an inner side of the shell.

10. The windshield wiper blade structure as claimed in claim 9, wherein a space is formed between each of two opposite lateral sides of the main body and the shell, and the space is larger than a thickness of each of the elastic arms.

* * * * *